D. GARST.
MANURE SPREADER.
APPLICATION FILED SEPT. 8, 1913.
1,140,371.
Patented May 25, 1915.
2 SHEETS—SHEET 1.
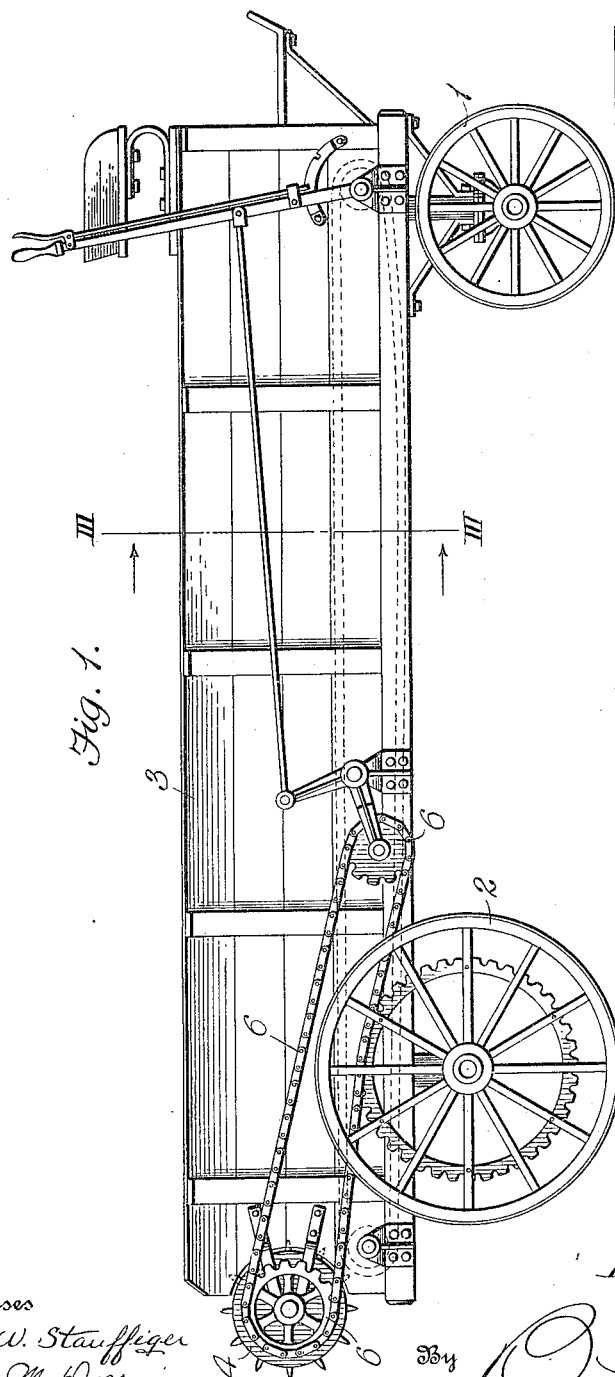
Witnesses
Chas. W. Stauffiger
Anna M. Dorr
Inventor
Dudley Garst,
By
Attorney D. GARST.
MANURE SPREADER.
APPLICATION FILED SEPT. 8, 1913.
1,140,371.
Patented May 25, 1915.
2 SHEETS—SHEET 2.
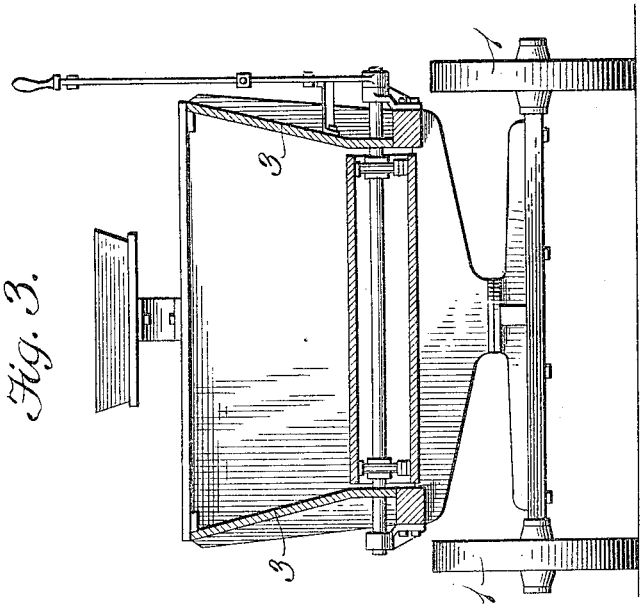
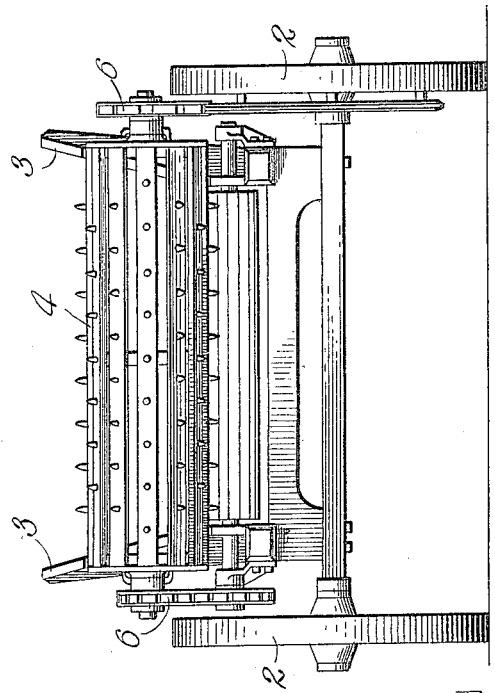
Witnesses
Chas W. Stauffiger
Anna N. Dorr
Inventor
Dudley Garst,
By
Attorneys

UNITED STATES PATENT OFFICE.

DUDLEY GARST, OF WATERLOO, IOWA.

MANURE-SPREADER.

1,140,371.   Specification of Letters Patent.   Patented May 25, 1915.

Application filed September 8, 1913. Serial No. 788,530.

*To all whom it may concern:*

Be it known that I, DUDLEY GARST, a citizen of the United States of America, residing at Waterloo, in the county of Blackhawk and State of Iowa, have invented certain new and useful Improvements in Manure-Spreaders, of which the following is a specification, reference being had therein to the accompanying drawings.

This invention relates to manure spreaders and more particularly to an arrangement of parts whereby even distribution of the load is obtained and any tendency of the operating parts to race or jump is prevented.

The invention consists in the matters hereinafter set forth, and more particularly pointed out in the appended claim.

In the drawings, Figure 1 is a view in side elevation, largely diagrammatic, of a spreader embodying features of the invention. Fig. 2 is a view in rear elevation of the spreader. Fig. 3 is a view in transverse section taken on or about line 111—111 of Fig. 1, parts of the operating mechanism being omitted.

Referring to the drawings, the running gear of a wagon, with front bearing wheels 1 and rear traction bearing wheels 2, carries a box that is of standard construction, except that its sides 3, 3 are outwardly inclined, the box being of the same width from end to end. A beater 4 of any preferred design, is journaled across the rear discharge end of the box so as to pick up the box contents and throw it out, as the latter is advanced against it by any suitable form of endless conveyers whose upper loaded limb traverses the box bottom from front to back. The beater and conveyer are operated by any preferred form of transmission gearing, such as indicated at 6, on the traction bearing wheels 2.

The chief feature of the invention is the arrangement of the inclined, flaring side boards whereby the tendency of the load is to crowd with sufficient friction against the sides of the box so that the conveyer is prevented from jumping or sliding back, if a wheel is momentarily arrested, as from dropping into a hole or the like. Another result obtained by the flaring sides is the fact that the load cannot draw inwardly from the margins of the conveyer as is frequently the case where the box sides are vertical.

In this form of spreader, with the outward inclination of the sides to guide it, the load which is always heaped highest in the center, cannot, so long as there is an appreciable amount over the conveyer, retract to any extent between the margins of the conveyer, consequently the feeder effectively distributes the load for the full width of the conveyer. As the load works down into the box it is compressed slightly, and presents the homogeneous mass to the action of the feeder so that the distribution of the latter is for this reason also, even and uniform.

Obviously, changes in the details of construction may be made without departing from the spirit of the invention, and I do not care to limit myself to any particular form or arrangement of parts.

What I claim is:—

A manure spreader comprising traction bearing wheels, a box supported thereon and provided with longitudinally parallel sides that are slightly and regularly flared from top to bottom, an endless conveyer that forms the bottom of the box and is so disposed in relation to the sides that substantially the entire weight of the load rests thereon, the sides having frictional engagement with the load throughout the length of the box, distributing means at the discharge end of the box, and mechanism driven by the traction bearing wheels and adapted to operate the conveyer and distributing means.

In testimony whereof I affix my signature in presence of two witnesses.

DUDLEY GARST.

Witnesses:
ANNA M. DORR,
C. R. STICKNEY.

Copies of this patent may be obtained for five cents each, by addressing the "Commissioner of Patents, Washington, D. C."